US009046141B2

(12) United States Patent
Bass et al.

(10) Patent No.: US 9,046,141 B2
(45) Date of Patent: Jun. 2, 2015

(54) DISC BRAKE CALIPER BODY AND A DISC BRAKE CALIPER COMPRISING SUCH A BODY

(75) Inventors: Richard Arnold Bass, Warwickshire (GB); Jonathan Paul Tait, Warwick (GB); John Arthur Heritage, Warwick (GB)

(73) Assignee: AP Racing Limited, Coventry (GB)

( * ) Notice: Subject to any disclaimer, the term of this patent is extended or adjusted under 35 U.S.C. 154(b) by 1006 days.

(21) Appl. No.: 12/218,499

(22) Filed: Jul. 14, 2008

(65) Prior Publication Data

US 2009/0071767 A1 Mar. 19, 2009

(30) Foreign Application Priority Data

Aug. 10, 2007 (GB) .................................. 0715585.6

(51) Int. Cl.
*F16D 55/228* (2006.01)
*G06F 17/50* (2006.01)
*F16D 55/00* (2006.01)

(52) U.S. Cl.
CPC ......... *F16D 55/228* (2013.01); *Y10T 29/49995* (2015.01); *F16D 2055/0016* (2013.01); *F16D 2055/0091* (2013.01)

(58) Field of Classification Search
CPC .......... F16D 55/228; F16D 2055/0091; F16D 2055/0016; F16D 55/226; F16D 2055/007
USPC ............................................. 188/73.47, 73.1
See application file for complete search history.

(56) References Cited

U.S. PATENT DOCUMENTS 3,183,999 A 5/1965 Buyze et al.
3,243,017 A * 3/1966 Werner Kleinstuck ...... 188/72.3
3,346,076 A * 10/1967 Hayes Edward J ........ 188/73.45
3,532,192 A * 10/1970 Falk Edward J ........... 188/73.43

(Continued)

FOREIGN PATENT DOCUMENTS

CN 1348534 A 5/2002
GB 879412 10/1961

(Continued)

OTHER PUBLICATIONS

Smith, Carroll "Monobloc Versus Two Piece Calipers" [Online], 2004. Available from http://www.stoptech_com/tech_info/wp_monobloc.shtml, 6 pgs.

(Continued)

*Primary Examiner* — Xuan Lan Nguyen
(74) *Attorney, Agent, or Firm* — Chernoff Vilhauer McClung & Stenzel, LLP

(57) ABSTRACT

A body for a disc brake caliper has a mounting side limb and a non-mounting side limb, each limb housing at least one hydraulic brake cylinder. The body has a peripheral stiffening band that extends about an outer lateral surface of at least one of the limbs. In a preferred embodiment, a peripheral stiffening band extends about an outer lateral surface of each of the limbs. The stiffening band or bands provide stiffness in the body under dynamic braking conditions with a minimum of material. A method of designing and manufacturing a body for a disc brake caliper involves analyzing the stiffness of the body under dynamic rather than static braking conditions and producing a caliper body with a desired level of stiffness under dynamic conditions while reducing the amount of material used to a minimum.

29 Claims, 14 Drawing Sheets

43 55b 55 32 55c 55a 42 42 42 61a 62 60 61b 33 34 62 51 35 35 52 50 42 42 42 45a 31 45 47 48 45b 49 45c

(56) References Cited

U.S. PATENT DOCUMENTS

| | | | | |
|---|---|---|---|---|
| 5,249,649 | A | 10/1993 | Emmons | |
| 6,302,243 | B1 * | 10/2001 | Ruiz | 188/73.1 |
| 7,438,161 | B2 * | 10/2008 | Burgoon et al. | 188/73.32 |
| 8,151,951 | B2 | 4/2012 | Cornolti et al. | |
| 2007/0170020 | A1 | 7/2007 | Halasy-Wimmer et al. | |
| 2008/0017458 | A1 * | 1/2008 | Aydt et al. | 188/73.1 |
| 2008/0135348 | A1 | 6/2008 | Drennen et al. | |
| 2008/0277216 | A1 | 11/2008 | Cornolti et al. | |

FOREIGN PATENT DOCUMENTS

| | | | |
|---|---|---|---|
| JP | S50-59484 | U | 6/1975 |
| JP | H03-234934 | A | 10/1991 |
| JP | 9257063 | | 9/1997 |
| JP | 2000-179595 | A | 6/2000 |
| JP | 2001-200870 | A | 7/2001 |
| JP | 200365367 | | 3/2003 |
| JP | 200365368 | | 3/2003 |
| JP | 2008-111551 | A | 5/2008 |
| WO | 2005078306 | A1 | 8/2005 |

OTHER PUBLICATIONS

Bakar, Abd Rahim Abu and Ouyang, Huajiang "Prediction of Disc Brake Contact Pressure Distributions by Finite Element Anaylsis" [Online], Feb. 15, 2007, Universiti Teknologi Malaysia. Available from http://www.penerbit.utm.my/ onlinejoumal/43/a/JTDIS43A3.pdf, 1 pg.

Search Report from corresponding United Kingdom Patent Application No. GB0715585.6. Date of search Nov. 28, 2007, 1 pg.

Search Report from corresponding European Patent Application No. 08252387.9 mailed Nov. 28, 2008, 6 pgs.

Search Report from corresponding United Kingdom Patent Application No. GB0715585.6. Date of search May 6, 2009, 1 pg.

Wilwood Disc Brakes, Racing Disc Brakes & Components 2004 Technical & Parts Catalog.

Withers & Rogers Llp, Opposition to European Patent 2022999B1 (Ap Racing Limited), Jul. 12, 2012 - Notice of Opposition Against Corresponding European Patent.

Documents Filed in Opposition.

Applicant's Reply to Opposition, Dec. 13, 2013.

Donovan, Thomas J., Barnes & Thornburg Llp Law Firm, 2014-08-29 Two-p. Letter to Charles D. McClung, Chernoff Vilhauer Llp Law Firm.

AP Racing 1990 Catalog, pp. 45-46.

AP Racing 1991-1993 Caliper Leaflets.

Alcon Components Ltd. D15 Technical Drawings for CAR64 Caliper.

Alcon Components Ltd. D17 Technical Drawings for CAR64 Caliper.

* cited by examiner 34
42
43
55c
61a
43
42
42
64
63a
70
43
64
63
32
31
63a
61b
45c
45b
35
45a
33

33
36b
32
45a
45b
45c
45
31
58
55b
55c
57
43
55a
34
X
61b
61a
60
40
42

134
155a
172
135
142
144
171
142
145b
155
145c
144
142
142
140
140
145a
171
172
135
133

DISC BRAKE CALIPER BODY AND A DISC BRAKE CALIPER COMPRISING SUCH A BODY

BACKGROUND OF THE INVENTION

This invention relates to a body for a disc brake caliper for motor vehicles and to a disc brake caliper comprising such a body.

In a typical disc brake, a brake caliper straddles the outer peripheral margin of a brake disc. The brake caliper usually has two limbs and is arranged so that the limbs overly opposite sides of the brake disc. Friction pads are received between each limb of the caliper and the brake disc and at least one of the limbs has one or more hydraulic piston and cylinder assemblies therein for applying the friction pads to the disc.

Known calipers are of two basic types, moving calipers and fixed calipers. In a moving type caliper, the limbs are movably connected to one another. One or more hydraulic piston and cylinder assemblies are located in a limb on one side of the disc for direct application of friction pad(s) on that side of the disc, the friction pad(s) on the other side of the disc being applied by the reaction movement of the other limb. In contrast, in a fixed caliper the limbs are rigidly interconnected at either end by a bridging member that spans the radial edge of the disc and each limb has one or more hydraulic piston and cylinder assemblies for direct application of the friction pads to their respective side of the disc.

Known disc brake calipers are usually secured to a support structure of the vehicle that is fixed relative to the brake disc, such as a stub axle or the forks of a motorcycle for example. In a typical arrangement, one of the limbs has two or more mounting portions, each having a fastener hole for receiving a fastener, such as a bolt, for mounting the caliper to the support structure.

A typical brake caliper comprises a body which includes the limbs and, in the case of a fixed caliper, the bridging members. Various components such as the pistons and seals are mounted to the body. Usually the body is manufactured from a metal such as aluminium, aluminium alloy or steel. The body may be formed as a casting which is machine finished or it may be machined from one or more solid pieces of metal or billets. Where the body is machined from billet, the billets may be rolled or they may be a forging.

In a moving type caliper, the two limbs are manufactured separately and interconnected by means of pins or the like so that the reacting limb can move relative to the fixed limb.

In the case of a fixed caliper, the body can be produced in two parts, each part typically comprising one of the limbs and part of each the bridging members. During manufacture, the parts are assembled together using bolts or other fastenings to form the caliper body. Alternatively, it is also known to produce a fixed caliper body in one piece. This latter arrangement is often referred to as a mono-bloc construction.

FIG. 1 shows the body 10 of a known fixed type brake caliper. The body 10 is of mono-bloc construction and comprises two limbs 11, 12 interconnected at either end by a spaced bridging member 13, 14. Stiffening struts 15, 16 extend at right angles to one another between the two limbs 11, 12 and the two bridging members 13, 14 respectively. The body 10 is designed to sit over the periphery of a brake disc (not shown) in a known manner with the limbs overlying opposing side faces of the disc. Three cylinders 17 are formed in each limb for receiving hydraulic pistons (not shown). In use, the pistons are moved inwardly towards the brake disc to press disc brake pads (not shown) into contact with opposing sides of the disc in a known manner. One of the limbs 11 has a pair of mounting holes 18 by means of which the caliper can be mounted to a fixed support.

When the brakes are applied, the clamping force applied by the disc pads to the disc is reacted by the body and results in the limbs 11, 12 being deflected outwardly away from the disc. This can result in an increased travel of the pistons and hence increased travel of the brake pedal. The caliper body 10 must have sufficient structural rigidity that these deflections are kept within acceptable tolerances. However, there is also a need to keep the weight of the caliper to a minimum. This is particularly so where the caliper is to be used on a high performance vehicle in which weight considerations are of great importance and where the braking forces are particularly high.

There is a need, therefore, for an improved disc brake caliper body which has increased structural rigidity or which can provide equivalent structural rigidity to that of conventional caliper bodies but using less material.

There is also a need for an improved disc brake caliper having such a body.

In known caliper bodies, the cylinders are located in a housing which forms part of the limb, such as the housings 20 on the body 10 shown in FIG. 1. Usually a lateral outer face 21 of the housing extends substantially perpendicularly to the axis of the cylinders and hence parallel to the friction surfaces of the disc in use. To save weight, the radially outer and inner faces (the upper and lower faces as shown) 22, 23 of the housing are sometimes machined to match the profile of the cylinders where this can be achieved without compromising the structural rigidity of the caliper. Where the upper and lower faces 22, 23 of the housing are machined in this way, the regions of the housing 24 surrounding the side walls of each cylinder extend generally parallel to the axis of the cylinder, except at the lateral inner and outer edges where they are radiused.

The known arrangements provide for a rigid structure whilst attempting to reduce the weight of the caliper body. However, there is a need for a caliper body having cylinder housings that provide increased rigidity or which can provide equivalent levels of rigidity with less material. There is also a need for an improved disc brake caliper having such a body.

BRIEF SUMMARY OF THE INVENTION

In accordance with a first aspect of the invention, there is provided a caliper body comprising a mounting side limb and a non-mounting side limb, each limb housing at least one hydraulic brake cylinder, in which the body has a peripheral stiffening band that extends about an outer lateral surface of at least one of the limbs.

At least one peripheral stiffening band may extend about an outer lateral surface of the mounting side limb.

The body may have two peripheral stiffening bands, one band running about an outer lateral surface of either limb.

Each limb may have at least two hydraulic brake cylinders and may be profiled to define a housing portion about each cylinder, the, or each, stiffening band interconnecting outer lateral end regions of the cylinder housing portions on its respective limb. Each limb may be profiled to define a partially domed or tapered cylinder housing portion about each cylinder. Each housing portion may have an outer lateral end region that faces outwardly in a lateral direction of the body, the at least one peripheral stiffening band being connected with the lateral end portion of each housing portion in the limb. Where the housing portions are partially dome shaped, the at least one peripheral stiffening band may be connected with each housing portion at a position which is at or adjacent an apex of the housing portion. The cylinder housing portions may be tapered and the lateral end portions may comprise lateral end wall portions that extend generally parallel to an inner lateral face of the limb. At least a portion of the at least one band may have a thickness which is less than the maximum diameter of the cylinder housing portions. At least a portion of the at least one peripheral band may have a thickness which is less than the diameter of the largest cylinder in the respective limb.

The at least one peripheral stiffening band may comprise a laterally outer region connected with a cylinder housing portion by means of a web, the web having a reduced thickness when compared with the laterally outer region of the band.

The at least one peripheral stiffening band may be provided on the mounting side limb and the band may increases in width from a trailing end of the limb towards a leading end of the limb.

The radially inner and outer surfaces of the, or each, band may be inclined at an angle relative to a lateral plane of the body taken perpendicularly to an inner lateral face of the limb.

The at least one peripheral band may be angled so as to extend radially and laterally outwardly from the outer lateral edge of its respective limb.

The limbs may be rigidly inter-connected by spaced bridging members, and the body may comprise a peripheral stiffening band on the mounting side limb which band extends around the leading end of the limb and is connected with a leading one of the bridging members.

The limbs may be rigidly inter-connected by spaced bridging members, the body may comprise a peripheral stiffening band on the non-mounting side limb which band extends around the trailing end of the limb and is connected with a trailing one of the bridging members.

The at least one peripheral stiffening band may have at least one opening therethrough. The least one opening may be positioned generally at the intersection between two adjacent cylinders in the respective limb.

The limbs may be interconnected by means of a first stiffening strut and the bridging members may be interconnected by means of a second stiffening strut. The second stiffening strut may have two portions, a first portion interconnecting a trailing bridging member and the first stiffening strut and a second portion interconnecting a leading bridging member and the first stiffening strut, in which the width of at least one of the portions of the second stiffening strut varies along its length. At least one lateral face of the at least one portion may be angled relative to a longitudinal axis of the body.

In accordance with a second aspect of the invention, there is provided a caliper body comprising a mounting side limb and a non-mounting side limb, each limb housing at least one hydraulic brake cylinder, in which each limb is profiled to define a partially domed or tapered cylinder housing portion about each cylinder.

Each housing portion may have an outer lateral end region that faces outwardly in a lateral direction of the body.

The housing portions may be partially dome shaped.

The cylinder housing portions may be tapered and the lateral end portions may comprise lateral end wall portions that extend generally parallel to an inner lateral face of the limb. The cylinder housing portions may be generally frusto-conical in shape.

In accordance with a third aspect of the invention, there is provided a caliper body for a disc brake caliper suitable for straddling a brake disc, said disc having opposed friction surfaces and a rotational axis, said disc having an axial direction parallel to said axis of rotation and a tangential direction parallel to an axis perpendicular to said axis of rotation and a radial direction parallel to an axis perpendicular to said tangential direction and intersecting said axis of rotation, said caliper body comprising:

a mounting side limb suitable to face a first friction surface of the disc having tangential ends;

a non-mounting side limb suitable to face the opposite friction surface of the disc having tangential ends;

a frame structure comprising at least two end bridges straddling the disc and connecting said mounting and non-mounting side limbs at said tangential ends;

wherein, said frame structure comprises spaced beams;

said body further comprises at least one of said mounting side and non-mounting side limbs having at least a cylinder housing portion suitable to house a piston for thrusting a pad against one of the friction surfaces of the disc;

at least an outer side cylinder housing portion is disposed close to a limb end with an external tangential side facing the limb tangential end; and, from said at least an outer side cylinder housing portion, at least two spaced beams depart from said external tangential side forming at least a portion of at least one of said end bridges encircling an opening.

In accordance with a fourth aspect of the invention, there is provided a disc brake caliper comprising a caliper body in accordance with either of the first or the second aspects of the invention.

In accordance with a fifth aspect of the invention, there is provided a method of designing a body for a disc brake caliper, the method comprising analysing the stiffness of the body under dynamic brake loading conditions when subject to a bending moment generated as a result of brake torque, designing the body so that it has a required level of stiffness under dynamic braking conditions whilst reducing the amount of material used to a minimum bearing in mind other design and manufacturing constraints.

In accordance with a sixth aspect of the invention, there is provided a method of manufacturing a body for a disc brake caliper, the method comprising analysing the stiffness of the body under dynamic brake loading conditions when subject to a bending moment generated as a result of brake torque, and manufacturing a caliper body so that it has a required level of stiffness under dynamic braking conditions whilst reducing the amount of material used to a minimum bearing in mind other design and manufacturing constraints.

BRIEF DESCRIPTION OF THE DRAWINGS

Several embodiments of the invention will now be described, by way of example only, with reference to the remaining drawings in which.

DETAILED DESCRIPTION OF A PREFERRED EMBODIMENT

Figure 1:
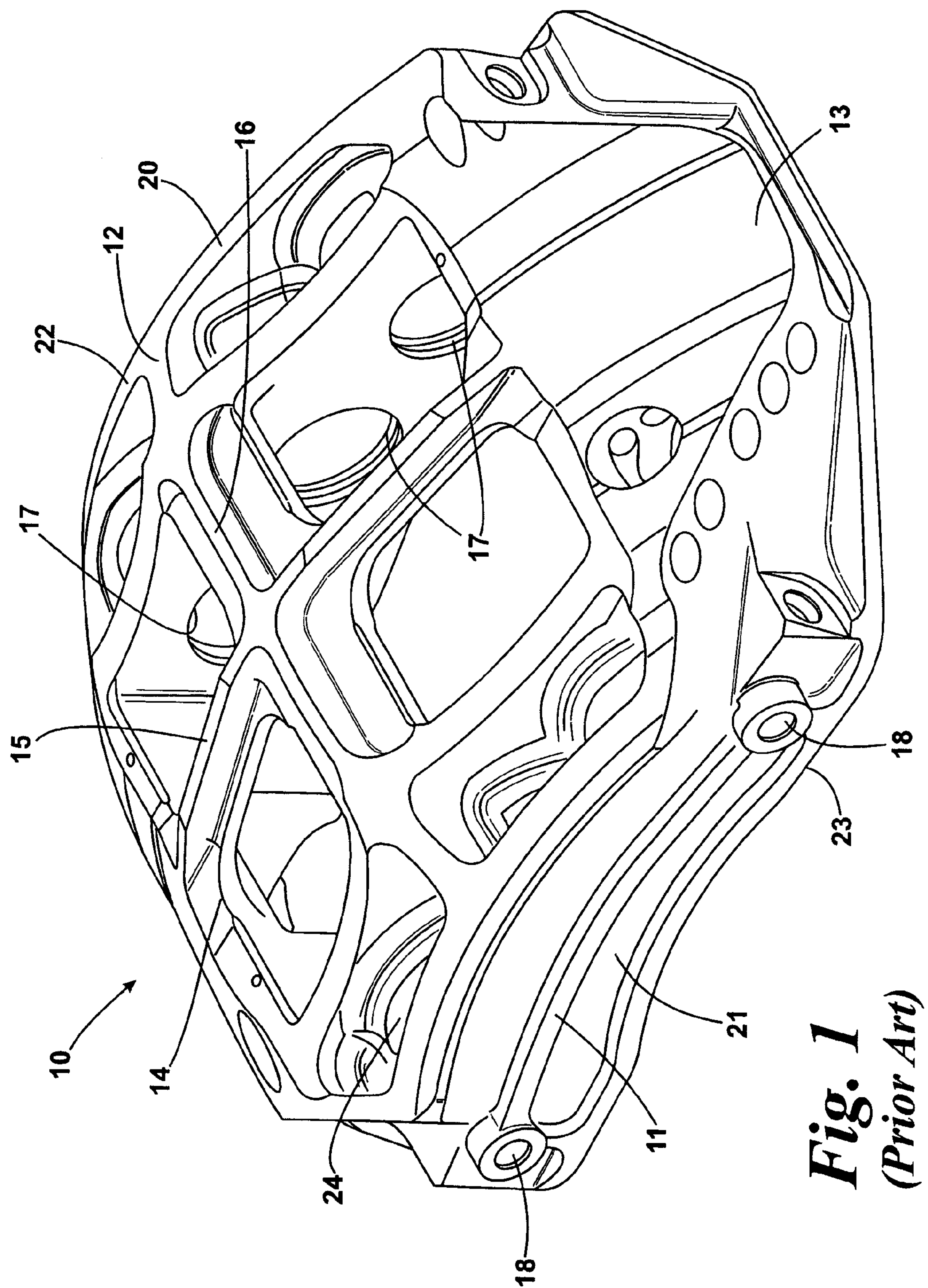
FIG. 1 is a perspective view of a known fixed type brake caliper.

With reference to FIGS. 2 to 7, there is shown a disc brake caliper body 30 in accordance with a first embodiment of the invention. The body 30 is for a fixed type caliper and includes a pair of limbs 31, 32 connected at either end by a bridging member 33, 34.

In the present embodiment, the caliper body 30 is of monobloc construction and is machined from a single block or billet of material, such as aluminium or aluminium alloy. However, the caliper body 30 could be formed by any suitable method of manufacture and using any suitable material. For example, the body could be manufactured in two parts and assembled together and/or the body could be formed by means of casting and machine finishing.

The caliper body 30 has a pair of mounting holes 35 at either end on one side, each mounting hole being located at the intersection between one of the limbs 31 and a respective bridging member 33, 34. The holes are arranged to receive fasteners such as bolts (not shown) for mounting the caliper to fixed support structure on the vehicle which acts as a torque reaction member. The limb 31 which locates on the same side of the disc as the support structure can be considered as a mounting side limb whilst the opposing limb 32 can be considered a non-mounting side limb.

In use, the caliper body is positioned so as to straddle the outer periphery of an associated brake disc (not shown) with a limb 31, 32 on either side of the disc in the usual manner. The body 30 as shown is configured for use with a brake disc on the right hand side of a vehicle and with the mounting side limb 31 positioned inboard of the disc. In this arrangement, the associated brake disc rotates about its axis in the direction of arrow A in FIG. 2 when the vehicle is travelling in a forward direction. The bridging member 33 can therefore be considered as the leading bridging member and that end of the body as the leading end. Conversely, the opposing bridging member 34 can be considered the trailing bridging member and that end of the body as the trailing end.

Figure 2:
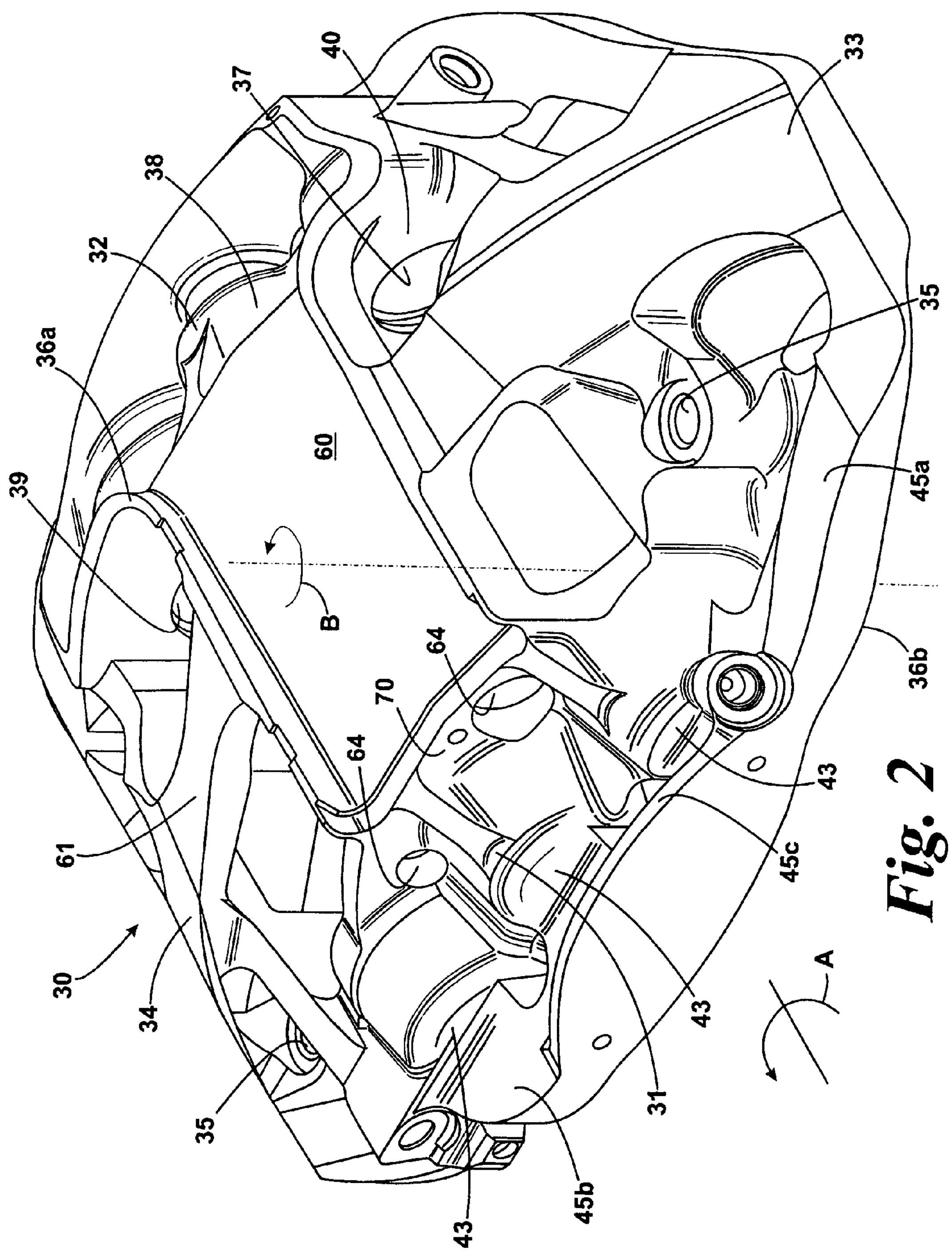
FIG. 2 is a perspective view of a first embodiment of a brake disc caliper body in accordance with the invention, the view being taken from a leading end of the body and to one side.
Figure 3:
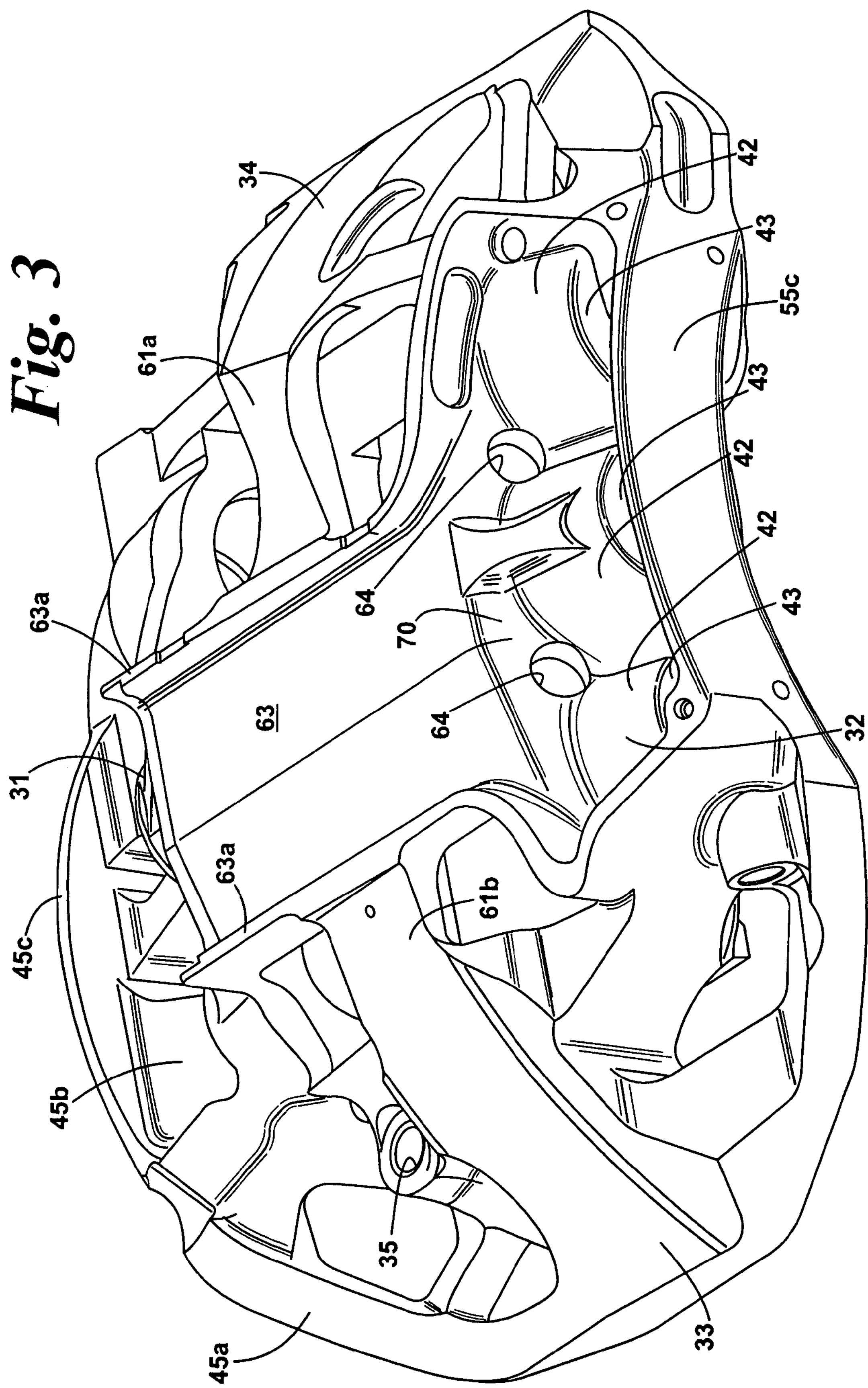
FIG. 3 is a view similar to that of FIG. 2 but taken from the other side of the caliper body.
Figure 4:
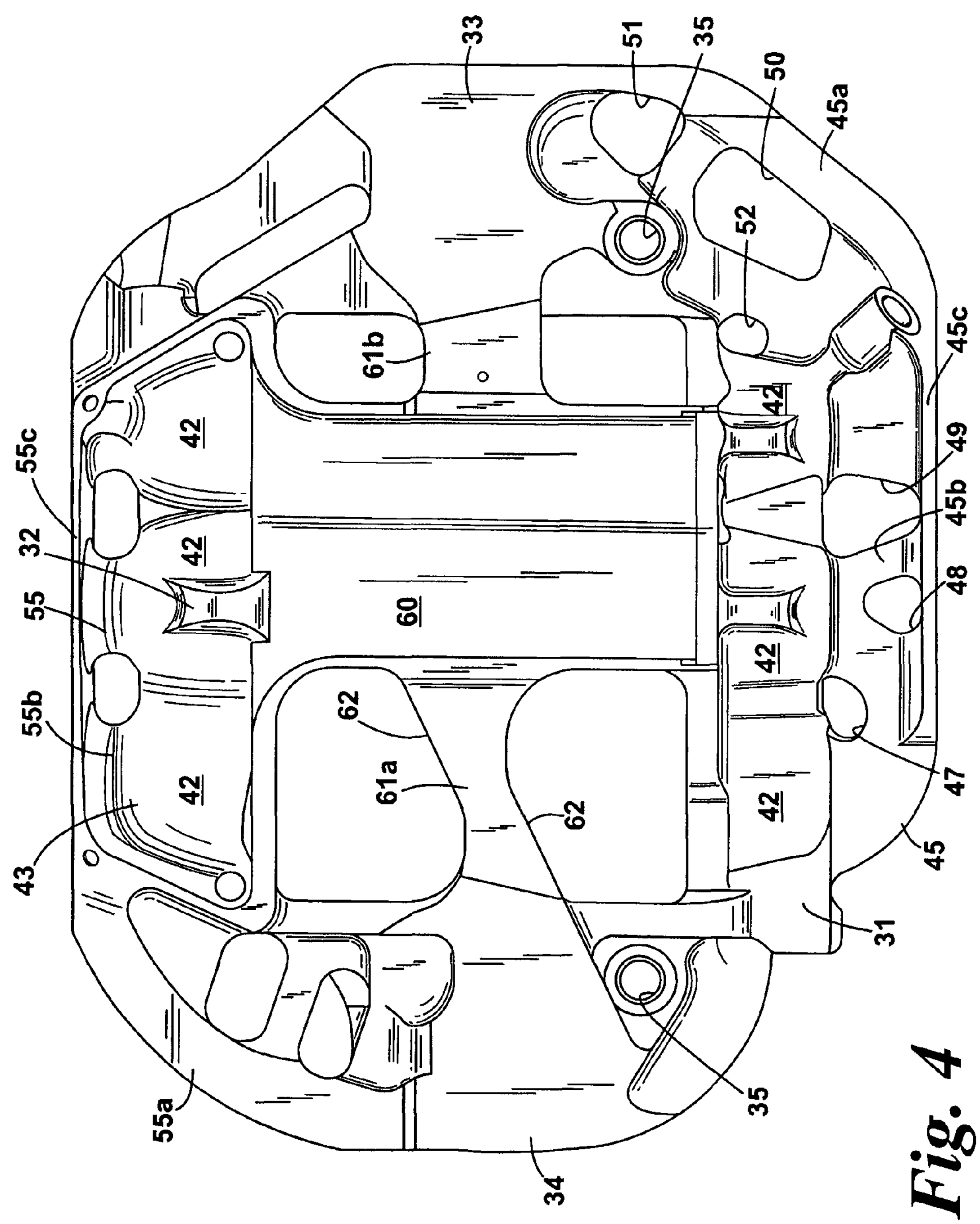
FIG. 4 is a plan view from above of the caliper body of FIG. 2.
Figure 5:
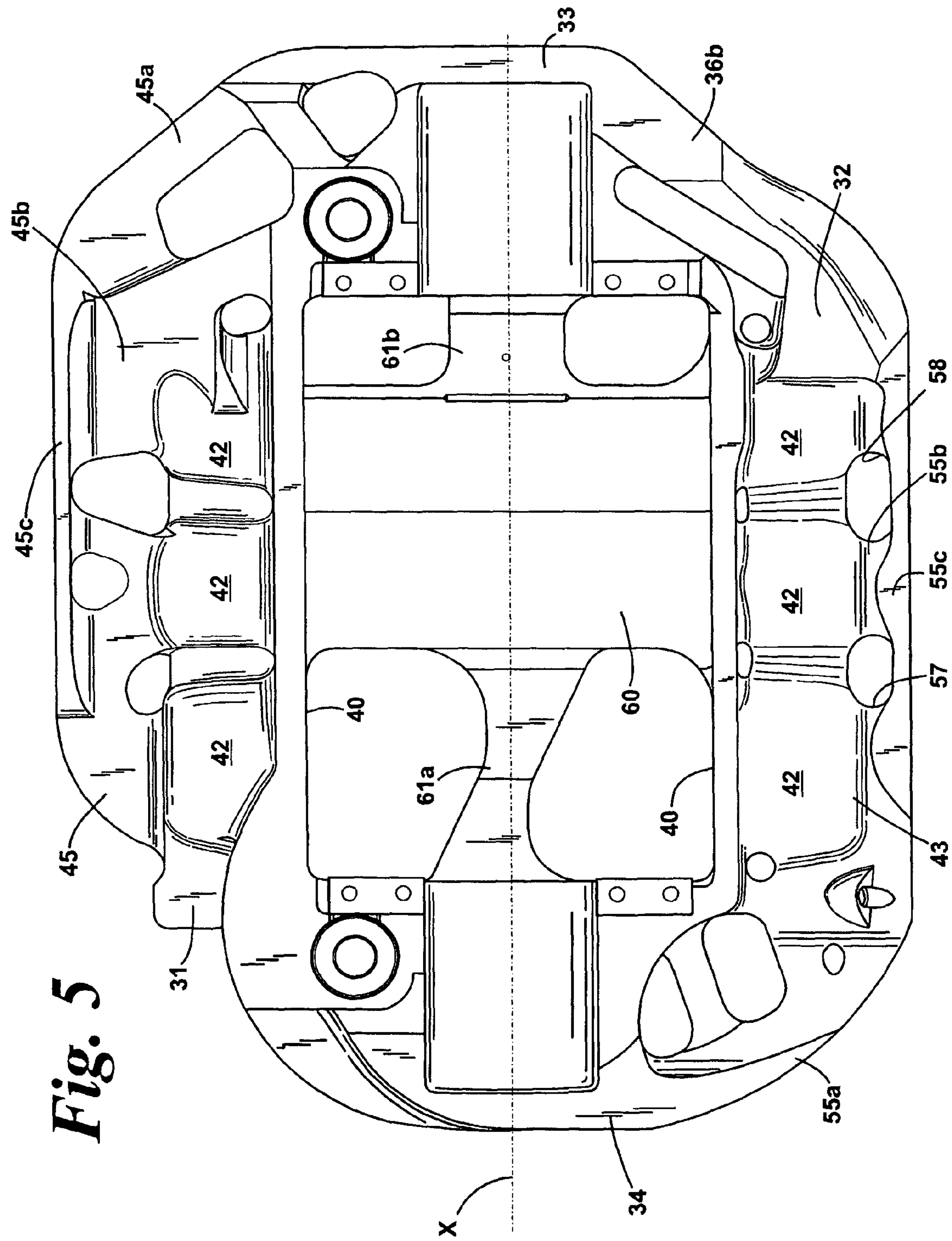
FIG. 5 is a plan view from below of the caliper body of FIG. 2.
Figure 6:
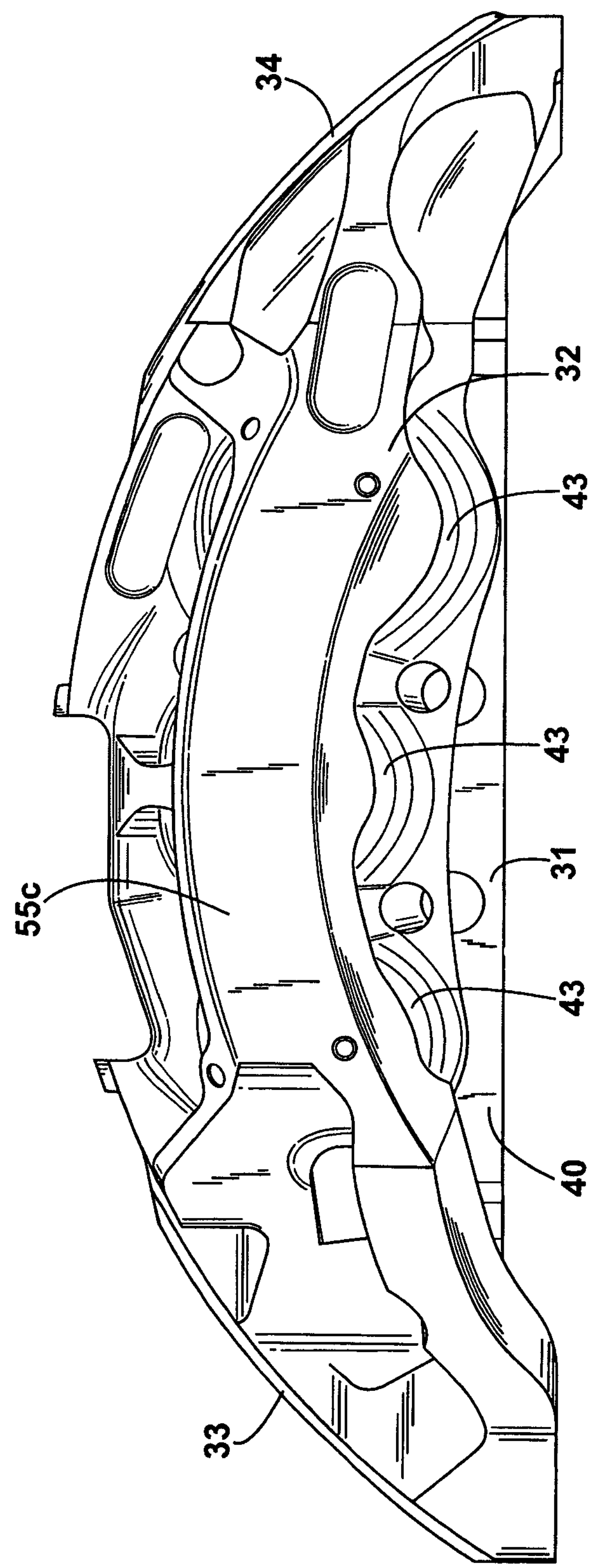
FIG. 6 is a side elevation of the caliper body of FIG. 2.
Figure 7:
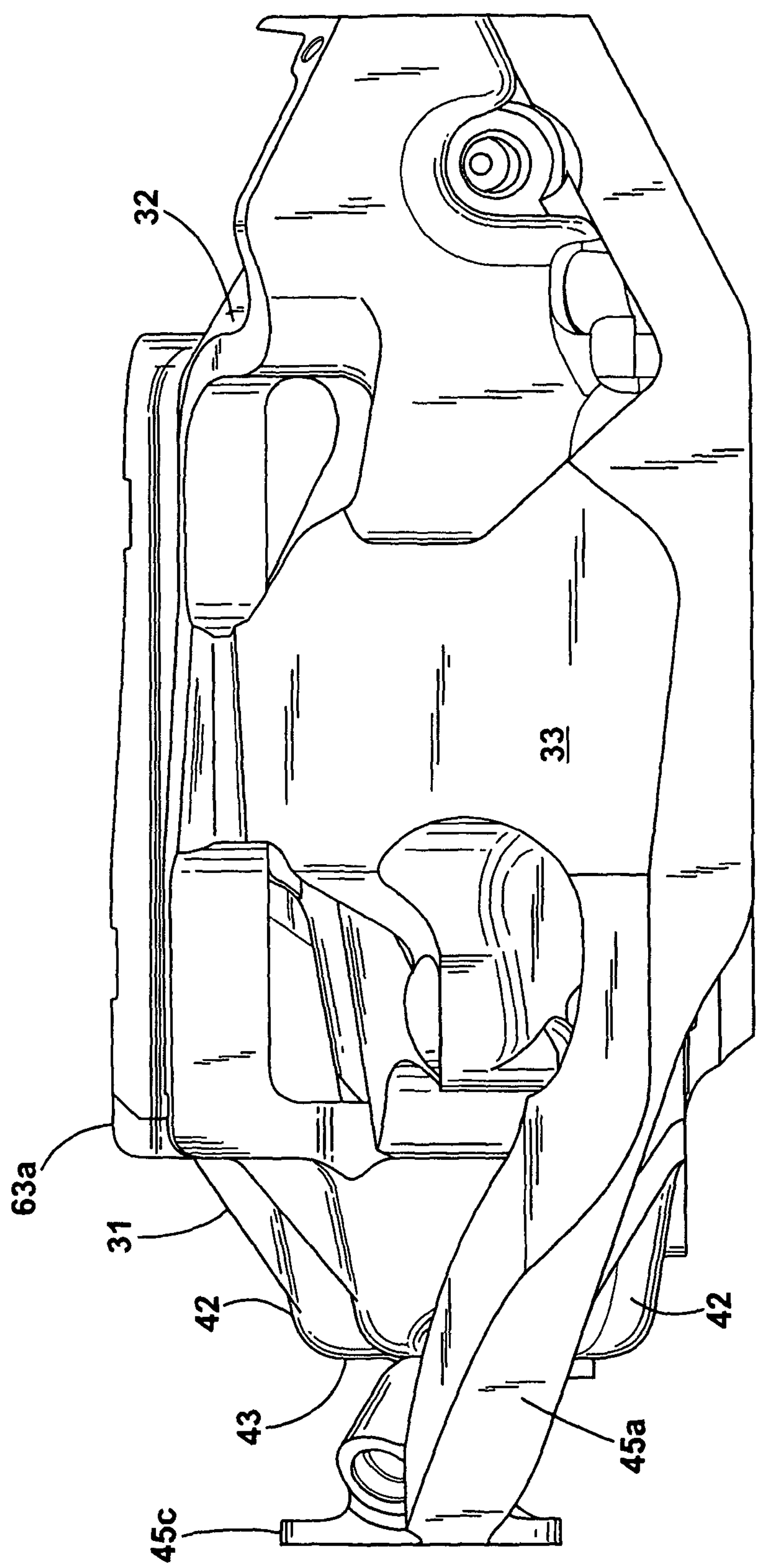
FIG. 7 is a view showing a leading end of the caliper body of FIG. 2.

For the sake of convenience, the term “radial” will be used herein in relation to the caliper body to indicate a direction from top to bottom or vice versa of the body as shown in FIG. 2, this direction generally corresponding with the radius of an associated brake disc when the caliper is in use. Thus the upper surface **36*a* of the caliper body as shown in FIG. 2 can be referred to as a radially outer surface as it faces in an outward direction in relation to the radius of an associated brake disc. Conversely the lower surface of the caliper body 36*b*** can be referred to as a radially inner surface.

Each of the limbs 31, 32 houses three cylinders 37, 38, 39 spaced longitudinally so that the cylinders 37, 38, 39 in one limb 31 oppose the cylinders 37, 38, 39 in the other limb 32. The cylinders are arranged so that when the caliper is in use, the cylinders are spaced circumferentially with respect to the disc. In use, each of the cylinders 37, 38, 39 houses a piston (not shown) which thrust friction pads (also not shown) against the opposing friction surfaces of the associated disc when the disc brake is actuated. The pads (not shown) may comprise a single arcuate pad on each side of the disc or may comprise a plurality of pads on each side of the disc so that there is a respective pad associated with each piston/cylinder assembly. Braking loads from the pads are transmitted to the caliper body 30 and via the fastenings to the torque reaction member.

The cylinders 37, 38, 39 are fluidly linked by means of fluid passages (not shown) in the caliper body to form a hydraulic brake fluid circuit in a known manner. Hydraulic brake actuating fluid is supplied to an inlet of the hydraulic fluid circuit so that when the vehicle brakes are operated, increasing hydraulic pressure in the piston and cylinder assemblies causes the brake pads to frictionally engage the brake disc to clamp the disc between the pads on either side. The hydraulic fluid circuit in the caliper also includes an outlet connection for a bleed nipple (not shown) to enable air to be bled from the hydraulic brake fluid circuit if required.

The cylinders 37, 38, 39 in each limb vary in size with the smallest diameter cylinder 37 located at the leading end and the largest diameter cylinder 39 located at the trailing end. This is to provide an even braking force over the full circumferential extent of the pads and to help reduce uneven wear of the pads in a known manner.

Each limb 31, 32 has a lateral inner face 40 which in use opposes a radial friction surface of an associated brake disc. The lateral inner face 40 is planar and is configured to extend substantially parallel to the friction surfaces of the associated disc.

Each of the limbs 31, 32 is profiled so as to form distinct housing portions 42 about each of the cylinders. In the present embodiment, the housing portions 42 taper towards the outer ends of the cylinders so as to have a generally frusto-conical shape. The outer ends of the housing portions 42 are radiused leading into generally planar lateral end face regions 43 which face outwardly of the body and are aligned generally parallel with the inner face 40 of the limbs. The cylinder housing portions 42 are interconnected by means of webs 44 between adjacent housing portions 42, the webs 44 being positioned approximately at a centre-line of the cylinders.

The body has a first peripheral stiffening band 45 which extends about the outer lateral surface of the mounting side limb 31. The first stiffening band 45 projects laterally outwardly from the lateral outer end regions 43 of the cylinder housing portions 42 and has a portion **45*a* which extends around the leading end of the limb 31 to connect the leading bridging member 33. The first band includes a web portion 45*b* which is connected with the lateral outer end regions 43 of the housing portions 42. The web portion 45*b* has a thickness measured in the radial direction of the body that is smaller than the maximum diameter of the largest of the housing portions 42 and, in this embodiment, is smaller than the diameter of the largest of the cylinders 39 in the limb. Over part of its length, the first band has a region 45*c* of increased thickness at the laterally outer end of the web 45*b*. The outer region 45*c* is generally oval shaped when viewed from the side of the caliper, as shown in FIG. 2, with curved radially outer and inner edges and serves to provide additional structural rigidity. In the present embodiment, the outer region 45*c* also acts as a mounting for part of an air cooling system to be described in more detail later. Several openings 47, 48, 49, 50, 51, 52 are formed through the band to reduce the weight of the material without compromising the structural rigidity of the body 30. At least two of the openings 47, 49**, are positioned between adjacent cylinders.

A second peripheral stiffening band 55 is provided about the lateral outer surface of the non-mounting limb 32. The second band 55 has a portion 55*a* that extends around the trailing end of the non-mounting limb to connect with the trailing bridging member 34. The second stiffening band 55 has a web region 55*b* connected to the lateral outer regions 43 of the housing portions 42 of the non-mounting limb 32 and which has a radial thickness which is less than the maximum diameter of the housing portion 42 surrounding the largest of the cylinders 39. As with the first band, the web region of the second band, has a radial thickness that is smaller than the diameter of the largest of the cylinders 39 in the limb 32. A region of 55*c* of increased radial thickness extends along the laterally outer edge of the second band 55. The region of increased thickness 55*c* provides structural rigidity but also forms part of a mounting for the air cooling system. Two openings 57, 58 are formed through the web region 55*b* of the second band 55 at positions between adjacent pairs of cylinders.

A first stiffening strut 60 extends across the gap between the two limbs 31, 32 in a lateral direction of the body generally perpendicular to a longitudinal axis of the body X. A second stiffening strut 61 extends across the gap to interconnect the bridging members 33, 34 to the first strut. The second strut has two portions, a first portion 61*a* extending between the trailing bridging member 34 and the first strut 60 and a second portion 61*b* extending between the leading bridging portion 33 and the first strut 60. It will be noticed that the width of the first portion 61*a* of the second strut varies along its length and that the lateral edges 62 of the strut are angled relative to the longitudinal axis of the caliper body 30.

The caliper body 30 is adapted for use with an air cooling system in which cooling air is blown over the cylinder housing portions 42 in both limbs. The cooling system is not shown in the drawings and does not form part of the invention. However, cooling air is introduced onto the mounting side limb 31 with some of the air flowing over the housing portions 42 in that limb whilst some of the air is guided by means of a cowling system across the first strut 60 and onto the cylinder housing portions 40 in the non-mounting side limb. The radially outer surface 63 of the first strut 60 is recessed to form a channel along which cooling air can be blown with a cowling mounted to the raised lips 63*a* at either side. The cowling is mounted to the region increased radial thickness 55*c* at the lateral outer edge of the second peripheral band 55 and is supported by a continuation of the lips 63*a* which connect with the region 55*c* to surround the cylinder housing portions 42 on the non-mounting side limb 32. Openings 64 are provided in a lateral inner wall region 70 of the limbs between the cylinder housing portions 42 through which the cooling air is able flow on to the disc and the disc pads in use.

As discussed in the previously, when a disc brake is actuated, the caliper body is subjected to deflection as the body 30 reacts the clamp load applied to the disc. In addition to this, if the brakes are applied whilst the disc is rotating, the caliper body 30 will be subject to a bending moment as a result of the torque loading. In the case of the caliper body as shown in FIG. 2, a bending moment in the direction of arrow B will be produced on the caliper body when the brakes are applied and the disc is rotating the direction of arrow A, as will be the case when the vehicle is travelling in a forward direction. This bending moment tends to twist the caliper body and can give rise to un-even wear of the brake pads. In addition, further unwanted forces can be generated as the caliper body 30 applies a force to the associated brake disc, tending to twist the disc about its axis. This can give rise to further deflection of limbs 31, 32 in the caliper for example.

Conventionally, caliper bodies have been designed to resist the deflection that arises when the body is subject to static brake loads (i.e. with the brake disc static) and thus have not taken into account the bending moment. In contrast, the caliper body 30 in accordance with the invention has been designed to take into account the bending moment generated by the brake torque under dynamic braking loads. In this regard, the peripheral stiffening bands 45, 55 are configured to resist the bending moment generated during braking. In tests, it has been found that the caliper body 30 exhibits increased stiffness when the body is subject to a bending moment under dynamic braking loads than when subject to static brake loads.

Due to the presence of the stiffening bands, less material is required elsewhere in the caliper body 30 so that the overall weight of the caliper is reduced when compared with a conventional caliper body having an equivalent stiffness. For example, only a minimum of material is required at the intersection of the mounting side limb 31 and the trailing bridging member 34. Similarly the leading end of the non-mounting side limb 32 and the leading bridging member 33 are connected by means of a beam of reduced radial thickness. Further more, the material used in the limbs 31, 32 surrounding the cylinders is reduced by profiling the cylinder housings 42 much more closely to the cylinders than in conventional caliper bodies. The tapered shape of the cylinder housing portions 42 is also believed to contribute to the structural rigidity and stiffness of the caliper body.

Whilst a caliper body in accordance with the invention can be arranged to provide equivalent levels of stiffness using less material than a conventional caliper body, those skilled in the art will appreciate that the inventive caliper body can be arranged to provide increased stiffness using the same amount of material as a conventionally designed caliper body.

Because conventional caliper bodies are designed cope with static braking forces they tend to have a generally symmetrical outer profile when viewed in plan. Of course conventional caliper bodies are not perfectly symmetrical because of the need to provide mountings and fluid connections but generally they have a largely symmetrical profile when viewed in plan. It will be noted that use of peripheral stiffening bands 45, 55 in the caliper body 30 and the removal of material elsewhere gives the body 30 a distinctly asymmetrical appearance when viewed in plan.

A second embodiment of a caliper 129 comprising a caliper body 130 in accordance with the invention is shown in FIGS. 8 to 12. The same reference numbers but increased by 100 will be used to indicate futures of the second embodiment that are the same as or which serve the same function as features of the first embodiment.

A fixed type caliper 129 has a body 130 comprising a pair of limbs 131, 132 connected at either longitudinal end of the body by a respective bridging member 133, 134.

The caliper body 130 is of mono-bloc construction and is machined from a single block or billet of material, such as aluminium or aluminium alloy. However, the caliper body 130 could be formed by any suitable method of manufacture and using any suitable material. For example, the body could be manufactured in two parts and assembled together and/or the body could be formed by means of casting and machine finishing.

The caliper body 130 has a pair of mounting holes 135 on one side, each mounting hole being located at the intersection between one of the limbs 131 and a respective bridging member 133, 134. The holes are arranged to receive fasteners such as bolts (not shown) for mounting the caliper to fixed support structure on the vehicle (also not shown) which acts as a torque reaction member. The limb 131 which locates on the same side of the disc as the support structure can be considered as a mounting side limb whilst the opposing limb 132 can be considered a non-mounting side limb.

Figure 9:
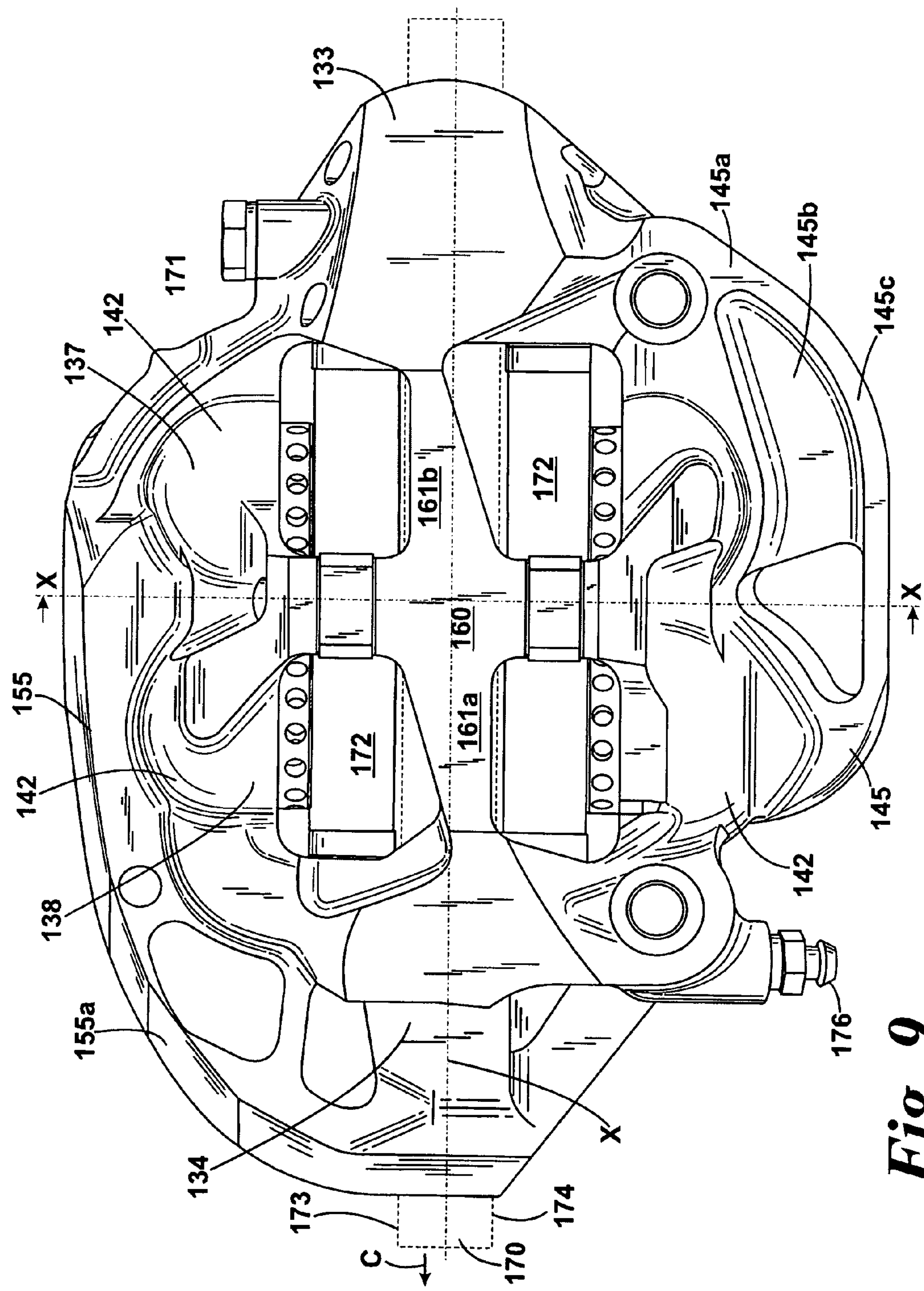
FIG. 9 is a plan view from above of the caliper of FIG. 8.
Figure 10:
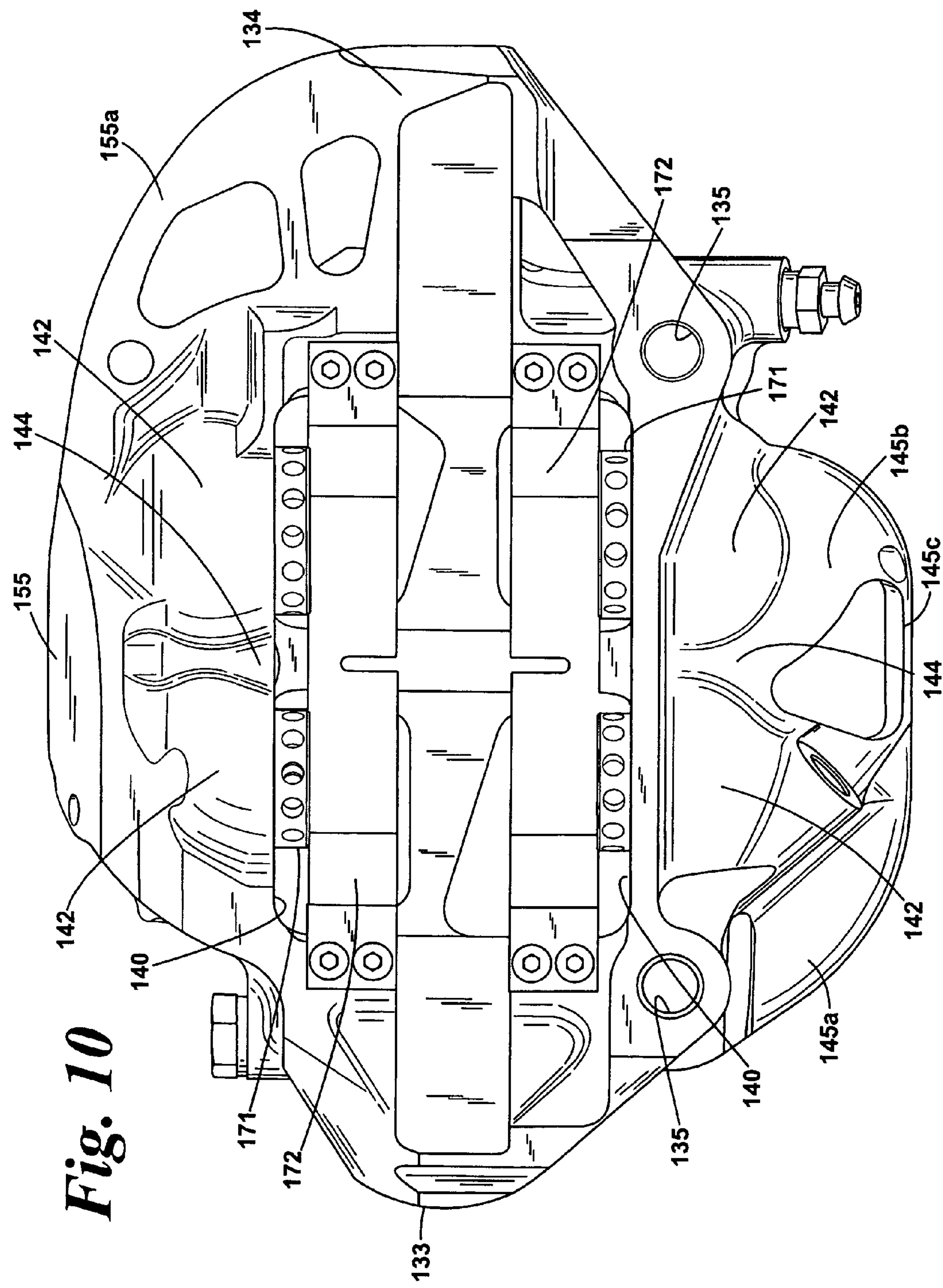
FIG. 10 is a plan view from below of the caliper of FIG. 8.
Figure 11:
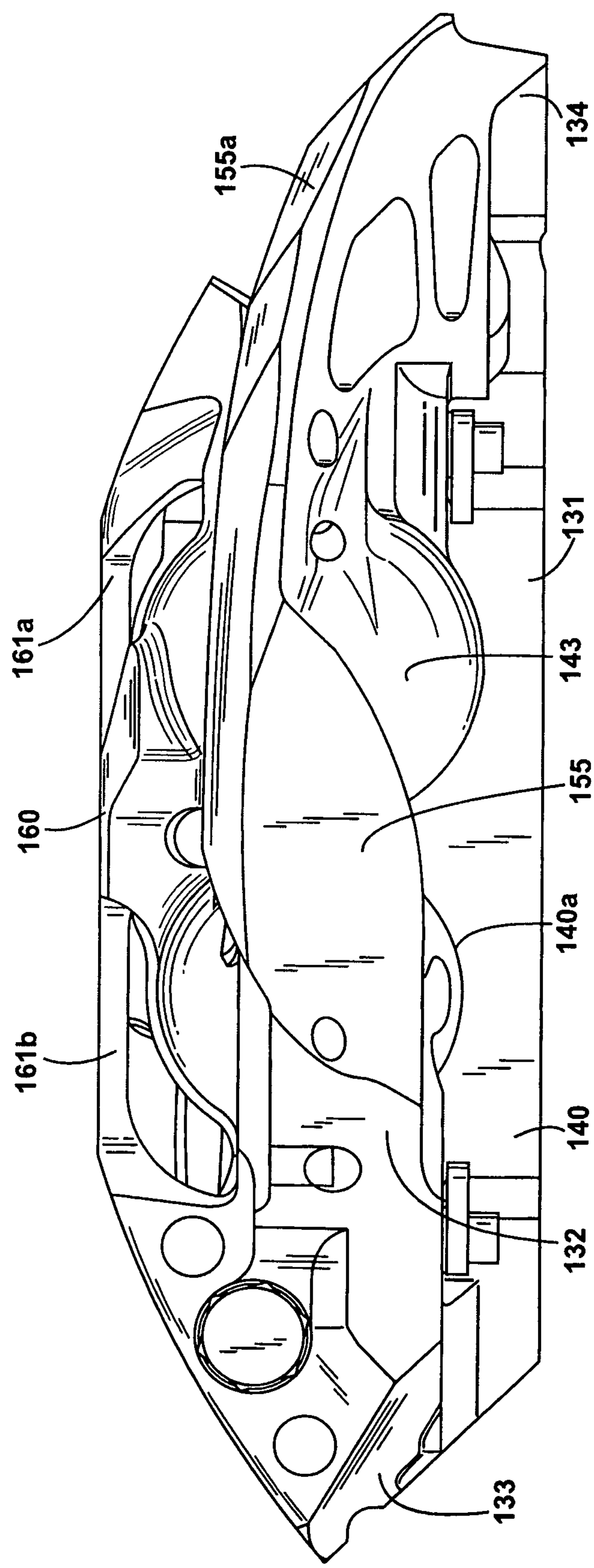
FIG. 11 is a side view of the caliper of FIG. 8.

As illustrated in FIG. 9, the caliper 129 configured to be positioned in use so as to straddle the outer periphery of an associated brake disc 170 with a limb 131, 132 on either side of the disc in the usual manner. The body 130 as shown is configured for use with a brake disc on the right hand side of a vehicle and with the mounting side limb 131 positioned inboard of the disc. In this arrangement, the associated brake disc rotates about its axis in the direction of arrow C in FIG. 9 when the vehicle is travelling in a forward direction. The bridging member 133 can therefore be considered as the leading bridging member and that end of the body as the leading end. Conversely, the opposing bridging member 134 can be considered the trailing bridging member and that end of the body as the trailing end.

Each of the limbs 131, 132 houses two cylinders 137, 138 spaced longitudinally so that the cylinders 137, 138 in one limb 131 oppose the cylinders 137, 138 in the other limb 132. The cylinders are arranged so that when the caliper is in use, the cylinders are spaced circumferentially with respect to the disc. In use, each of the cylinders 137, 138, houses a piston 171 which thrust friction pads 172 against the opposing friction surfaces 173, 174 of the associated disc when the disc brake is actuated. The pads 172 may comprise a single arcuate pad on each side of the disc or may comprise a plurality of pads on each side of the disc so that there is provided a respective pad associated with each piston/cylinder assembly. Braking loads from the pads 172 are transmitted to the caliper body 130 and via the fastenings to the torque reaction member.

The cylinders 137, 138 are fluidly linked by means of fluid passages (not shown) in the caliper body to form a hydraulic brake fluid circuit in a known manner. Hydraulic brake actuating fluid is supplied to an inlet 175 of the hydraulic fluid circuit so that when the vehicle brakes are operated, increasing hydraulic pressure moves the pistons 171 inwardly pressing the pads 172 in to engagement with the brake disc so that the disc is clamped between the pads on either side. The hydraulic fluid circuit in the caliper also includes an outlet connection for a bleed nipple 176 to enable air to be bled from the hydraulic brake fluid circuit if required.

The cylinders 137, 138, in each limb are of different sizes with the smallest diameter cylinder 37 located at the leading end and the largest diameter cylinder 138 located at the trailing end. This is to provide an even braking force over the full circumferential extent of the pads and to help reduce uneven wear of the pads in a known manner.

Figure 14:
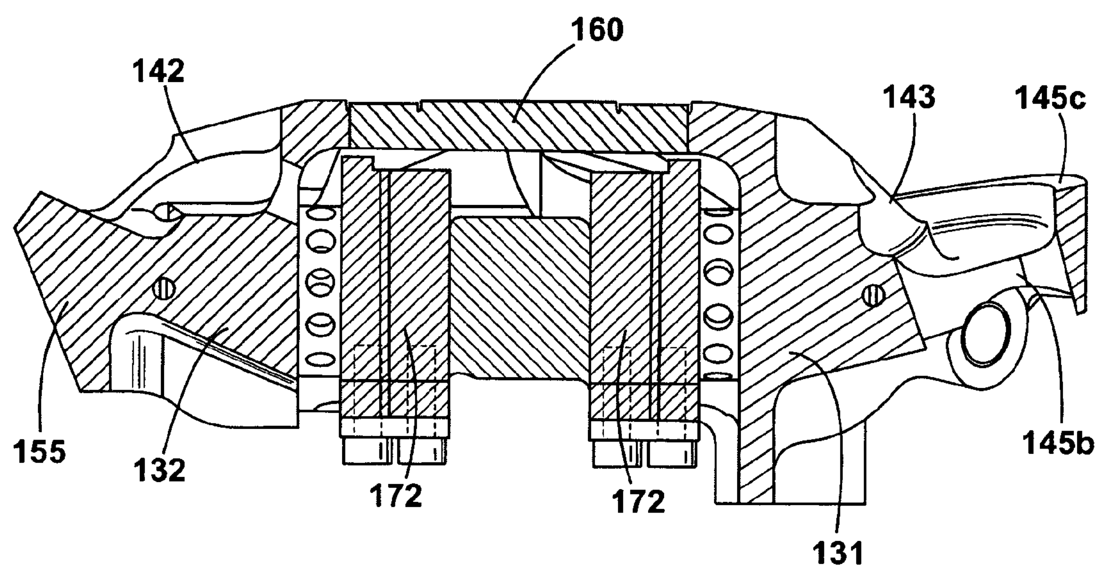
FIG. 14 is a cross sectional view through the caliper of FIG. 8 taken on line X-X on FIG. 9.

Each limb 131, 132 has a lateral inner face 140 which in use opposes a radial friction surface 173, 174 of the associated brake disc 170. The lateral inner face 140 is planar and is configured to extend substantially parallel to the friction surfaces of the associated disc. As can be seen best from FIGS. 11 and 14, the inner face 140 on the mounting side limb has a greater radial depth than the inner face of the 140 on the non-mounting side limb. On the non-mounting side limb, the lower or radially inner edge 140*a* of the inner face 140 follows closely the contours of the cylinder housing portions. However, the mounting side limb has a larger generally rectangular shaped inner wall portion to provide additional structural rigidity for the mounting portions in which the mounting holes 135 are formed.

Each of the limbs 131, 132 is profiled so as to form distinct housing portions 142 about each of the cylinders. In the present embodiment, the housing portions 142 are partially dome shaped having lateral end surface regions 143 which face outwardly in a lateral direction of the body 130. Side wall regions of the housing portions 142 are interconnected by means of webs 144.

A first peripheral stiffening band 145 extends about the lateral outer surface of the mounting side limb 131. The first band 145 has a lateral outer region 145*c* which is connected to the outer lateral surface region 143 of the cylinder housing portion 142 about the larger of the cylinders 138 and extends in an arc about the other of the cylinder housing portions 142 where it connects with the leading bridging member 133. The first stiffening band 145 has a web region 145*b* of reduced radial thickness which is connected to the outer lateral surface region 143 of the cylinder housing portion 142 surrounding the smaller of the cylinders 137 at the leading end of the limb 131. The first peripheral band 145 in this embodiment is connected with the lateral outer end regions 143 at a position which at or close to the apex of the dome shaped housing portions 142. As can be seen from FIG. 9, the width (measured in a lateral direction of the caliper body) of the first peripheral band increases from the trailing end of the limb 131 towards the leading end.

The web portion 145*b* has a thickness measured in the radial direction of the body that is smaller than the maximum diameter of the largest of the cylinder housing portions 142. The radial thickness of the web 145*b* in this embodiment also being smaller than the diameter of the largest of the cylinders 138 in the mounting side limb 131.

Figure 12:
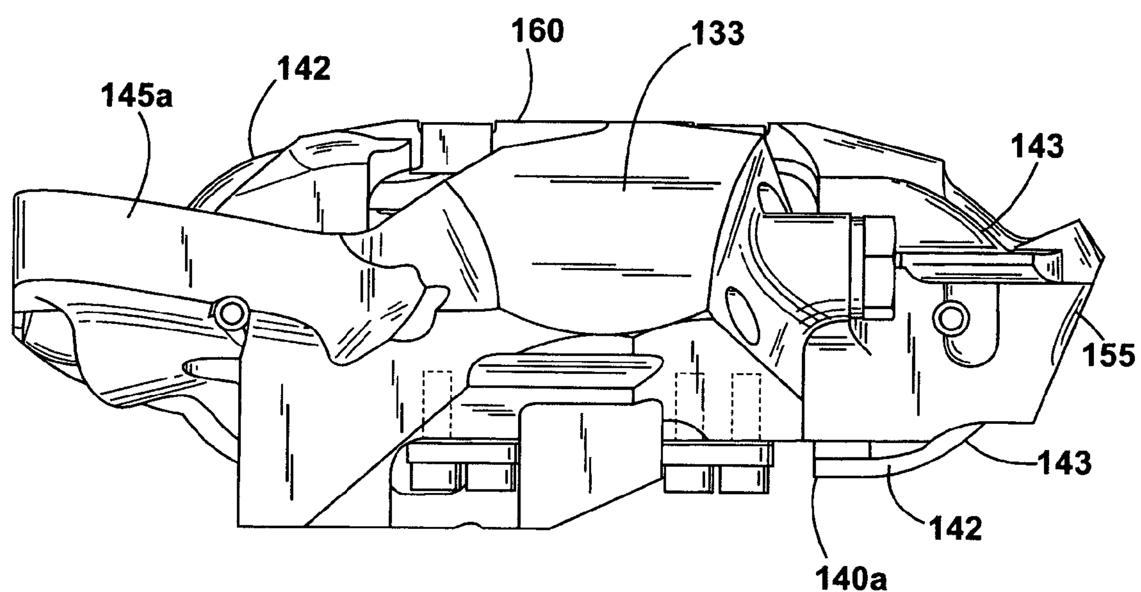
FIG. 12 is a view of a leading end of the caliper of FIG. 8.
Figure 13:
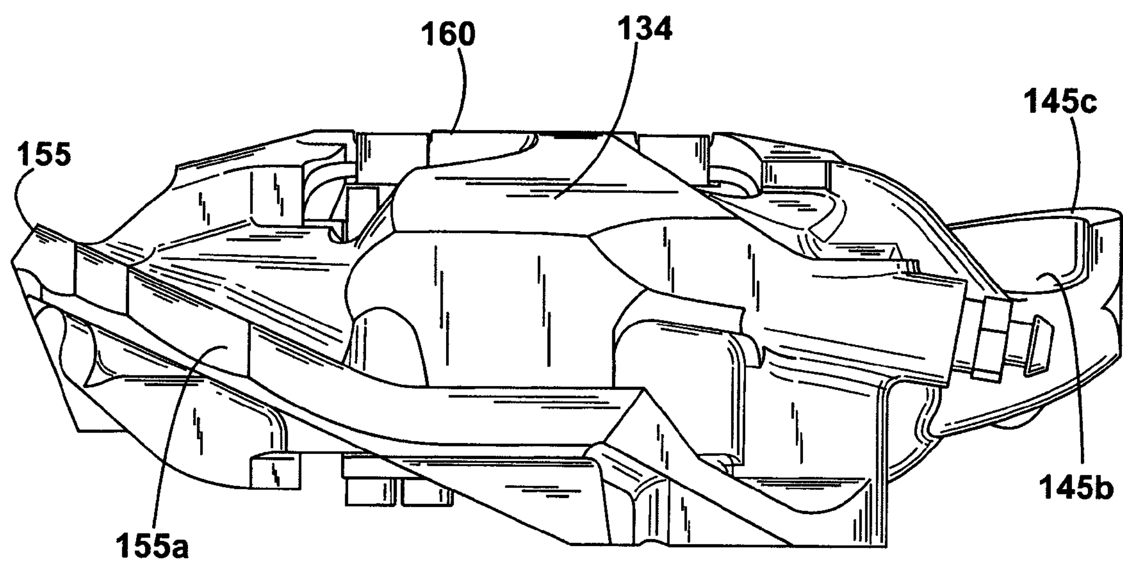
FIG. 13 is a view of a trailing end of the caliper of FIG. 8.

As can be seen best in FIG. 12 the first peripheral stiffening band 145 is angled radially and laterally outwardly. Thus with the caliper body as shown in FIG. 12, the first peripheral band 145 extends upwardly and laterally away from the mounting side limb 131.

As with the first embodiment, a second peripheral stiffening band 155 is provided about the lateral outer surface of the non-mounting limb 132. The second band 155 has a portion 155*a* that extends around the trailing end of the non-mounting limb 132 to connect with the trailing bridging member 134. The second stiffening band 155 is connected to the lateral outer regions 143 of the housing portions 142 of the non-mounting limb 132 and has a radial thickness which is less than the maximum diameter of the housing portion 142 surrounding the largest of the cylinders 138. At least the portion 155*a* of the second peripheral band 155 has a radial thickness that is smaller than the diameter of the largest of the cylinders 138 in the limb 132.

Figure 8:
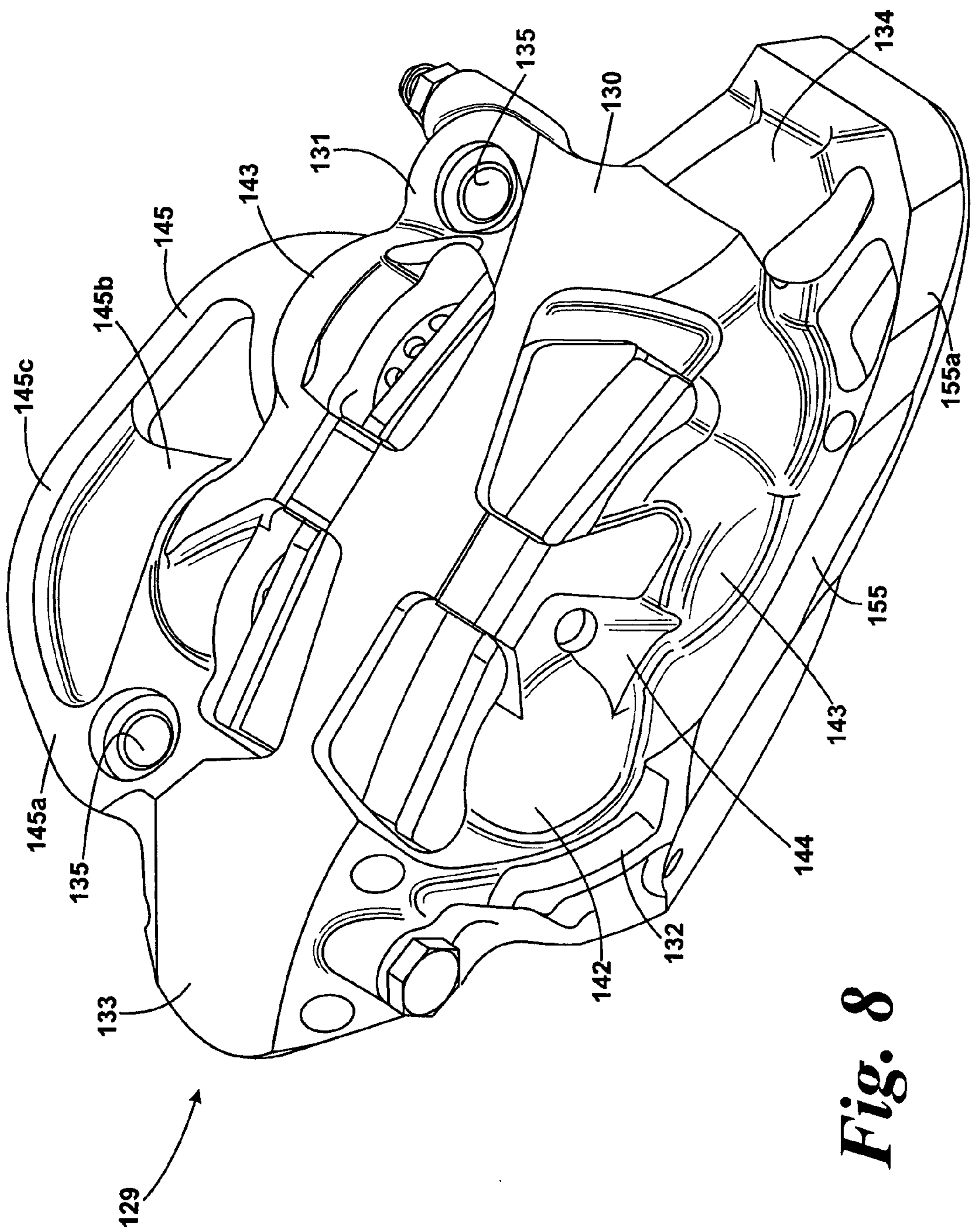
FIG. 8 is a perspective view of a brake disc caliper having a caliper body in accordance with a second embodiment of the invention.

The second peripheral stiffening band 155 is also angled radially and laterally outwardly. Thus with the caliper body as shown in FIG. 8, the second peripheral band 155 extends upwardly and laterally away from the non-mounting side limb 132, the upper and lower surfaces of the band being angled relative to a vertical plane taken longitudinally through the body.

A first stiffening strut 160 extends across the gap between the two limbs 131, 132 in a lateral direction of the body generally perpendicular to a longitudinal axis X of the body. A second stiffening strut 161 extends across the gap to interconnect the bridging members 133, 134 to the first strut. The second strut has two portions, a first portion 161*a* extending between the trailing bridging member 134 and the first strut 160 and a second portion 161*b* extending between the leading bridging portion 133 and the first strut 160. It will be noticed that the width of the both portions 161*a*, 161*b* of the second strut vary along their length, with ends connected to the first strut being wider than the ends connected with their respective bridging members 133, 134. As can be seen best from FIG. 9, the non-mounting side edge 161*c* of the first portion 161*a* and the mounting side edge 161*d* of the second portion 161*b* are angled relative to the longitudinal axis X of the caliper body, whilst the other side edges run parallel to the longitudinal axis X.

As discussed in relation to the first embodiment, the peripheral stiffening bands 145, 155 increase the stiffness of the caliper body, particularly when the body is subject to a bending moment as the brakes are applied with the disc rotating in a forward direction. The presence of the peripheral bands 145, 155 enables material elsewhere in the caliper body to be reduced to a minimum, particularly in the limbs where much of the material present in conventional caliper bodies is reduced to form distinct, partially domed cylinder housings 142. The material at the intersection between the leading bridging member 133 and the non-mounting side limb 132 and between the trailing bridging member 134 and the mounting side limb 131 is also reduced to a minimum. These arrangements result in a caliper profile that is highly asymmetrical when viewed in plan.

The partial dome shape of the cylinder housing portions 142 is also believed to contribute to the structural rigidity of the caliper body 130 in a similar manner to the tapered cylinder housing portions 42 in the first embodiment. In certain applications, it may be beneficial to apply the concept of profiling the limbs to form distinct tapered or partially domed cylinder housing portions even without peripheral stiffening bands.

The concept of designing a caliper body to provide a required level of stiffness when subject to dynamic brake loads, including a bending moment resulting from the braking torque, whilst minimising the material used in the body can be applied to numerous caliper body applications and may be claimed independently. Similarly, a method of manufacturing a brake caliper body such that the body has a required level of stiffness when the caliper is subject to dynamic brake loads, including a bending moment resulting from the braking torque, whilst minimising the material used in the body may also be claimed independently. Those skilled in the art will appreciate that whilst minimising the material used in the caliper body is desirable, other design and manufacturing considerations may require the amount of material used is not absolutely the minimum required to provide the desired stiffness. For example, it is necessary that the stress levels in the caliper be kept within acceptable limits.

Whereas the invention has been described in relation to what is presently considered to be the most practical and preferred embodiment, it is to be understood that the invention is not limited to the disclosed arrangements but rather is intended to cover various modifications and equivalent constructions included within the spirit and scope of the invention. For example, whilst it is preferred that a peripheral stiffening band be provided about each of the limbs, this need not be the case and significant advantages can be achieved by having a single peripheral band about only one of the limbs. Furthermore, whilst the invention has particular application to fixed type disc brake calipers, the principles could be applied to moving type calipers.

The invention claimed is:

1. A disc brake caliper body, the disc brake caliper body having opposite longitudinal ends, a mounting side and a non-mounting side, and comprising a mounting side limb and a non-mounting side limb, said limbs being rigidly interconnected at either longitudinal end of the caliper body by a respective bridging member, the disc brake caliper body defining a pair of longitudinally spaced mounting holes located in the mounting side of the body, each limb having an outer lateral surface and at least two hydraulic brake cylinders defined therein, said brake cylinders suitable for receiving corresponding hydraulic brake pistons, and each limb being profiled to define a housing portion about each cylinder, in which the body has two peripheral stiffening bands, each peripheral stiffening band extending about an outer lateral surface of a respective one of the limbs and interconnecting outer lateral end regions of the cylinder housing portions of said respective limb, at least one of said peripheral stiffening bands having a portion extending about a longitudinal And of its respective limb and connecting with a respective bridging member at that longitudinal end of the caliper body, at least one opening, separate from said mounting holes, being defined in a region of the caliper body located between said extending portion of said at least one peripheral stiffening band, said longitudinal end of said respective limb and said respective bridging member.

2. A disc brake caliper body as claimed in claim 1, in which each limb is profiled to define a partially domed or tapered cylinder housing portion about each cylinder.

3. A disc brake caliper body as claimed in claim 2, in which each housing portion has an outer lateral end region that faces outwardly in a lateral direction of the disc brake caliper body, each peripheral stiffening band being connected with the lateral end portion of each housing portion.

4. A disc brake caliper body as claimed in claim 2 or claim 3, in which each of the housing portions are partially dome shaped and each peripheral stiffening band is connected with each housing portion at a position which is at or adjacent an apex of the housing portion.

5. A disc brake caliper body as claimed in claim 2 or 3, in which the cylinder housing portions are tapered and the lateral end portions comprises lateral end wall portions that extend generally parallel to an inner lateral face of the limb.

6. A disc brake caliper body as claimed in claim 2, in which at least a portion of each peripheral stiffening band has a thickness which is less than the maximum diameter of the hydraulic cylinder housing portions.

7. A disc brake caliper body as claimed in claim 6, in which each peripheral stiffening hand has a thickness which is less than the diameter of the largest hydraulic brake cylinder.

8. A disc brake caliper body as claimed in claim 1, in which at least one of the peripheral stiffening bands comprises, over at least part of said peripheral stiffening band's length, a laterally outer region connected with a cylinder housing portion by means of a web, the web having a reduced radial thickness when compared with the laterally outer region.

9. A disc brake caliper body as claimed in claim 1, in which the peripheral stiffening band on the mounting side limb increases in width from a trailing end of the limb towards a leading end of the limb.

10. A disc brake caliper body as claimed in claim 1, in which the radially inner and outer surfaces of at least one of the peripheral stiffening bands are inclined at an angle relative to a lateral plane of the body taken perpendicularly to an inner lateral face of the limb.

11. A disc brake caliper body as claimed in claim 1, in which at least one of the peripheral stiffening bands is angled to extend radially and laterally outwardly from the outer lateral edge of its respective limb.

12. A disc brake caliper body as claimed in claim 1, in which the caliper body has a leading end and a trailing end, the peripheral stiffening band on the mounting side limb extending around a leading end of the limb and being connected with a leading one of the bridging members, said at least one opening being defined in said region of the disc brake caliper body located between said extending portion of said peripheral stiffening band on the mounting side limb, said leading end of said mounting side limb and said leading bridging member.

13. A disc brake caliper body as claimed in claim 1, in which the caliper body has a leading end and a trailing end, the peripheral stiffening band on the non-mounting side limb extending around the trailing end of the limb and being connected with a trailing one of the bridging members, said at least one opening being defined in said region of the disc brake caliper body located between said extending portion of said peripheral stiffening band on the non-mounting side limb, said trailing end of said non-mounting side limb and said trailing bridging member.

14. A disc brake caliper body as claimed in claim 1, in which at least one of the peripheral stiffening bands has at least one further opening extending therethrough in a radial direction and positioned generally at the intersection between two adjacent cylinders in the respective limb.

15. A disc brake caliper body as claimed in claim 1, in which the limbs are interconnected by means of a first stiffening strut and the bridging members are interconnected by means of a second stiffening strut.

16. A disc brake caliper body as claimed in claim 15, in which the second stiffening strut comprises two portions, a first portion interconnecting a trailing bridging member and the first stiffening strut and a second portion interconnecting a leading bridging member and the first stiffening strut, in which the width of at least one of the first and second portions of the second stiffening strut varies along its length.

17. A disc brake caliper body as claimed in claim 16, in which at least one lateral face of said at least one of the first and second portions of the second stiffening strut is angled relative to a longitudinal axis of the body.

18. A disc brake caliper body as claimed in claim 1 wherein said at least one opening is non-circular.

19. A disc brake caliper body as claimed in claim 1 wherein said at least one opening has an irregular shape.

20. A disc brake caliper body as claimed in claim 1 wherein said at least one opening is located in a portion of said stiffening band which is located longitudinally outwardly of the portion of the respective limb which defines said housing portions.

21. A disc brake caliper body as claimed in claim 1 wherein said at least one opening comprises two openings which are defined in said region of the disc brake caliper body located between said extending portion of said at least one peripheral stiffening band, said longitudinal end of said respective limb and said respective bridging member.

22. A disc brake caliper body, the disc brake caliper body having opposite longitudinal ends, one of said ends being a leading end and the other a trailing end, the disc brake caliper body comprising a mounting side limb and a non-mounting side limb, said limbs being rigidly interconnected at either longitudinal end of the disc brake caliper body by a respective bridging member, the disc brake caliper body defining a pair of longitudinally spaced, radially directed mounting holes in the mounting side of the disc brake caliper body, each of said limbs having at least two brake cylinder housing portions, the disc brake caliper body having two peripheral stiffening bands, each peripheral stiffening band extending about a respective one of the limbs interconnecting outer lateral end regions of the cylinder housing portions of said respective limb, at least one of the limbs has a lateral inner wall region which extends between an adjacent pair of said cylinder housing portions, wherein a through opening is defined in said lateral inner wall region, at least one of said peripheral stiffening bands having a portion extending about a longitudinal end of its respective limb and connecting with a respective bridging member at that longitudinal end of the disc brake caliper body, at least one further opening being defined in a region of the disc brake caliper body located between said extending portion of said at least one peripheral stiffening band, said longitudinal end of said respective limb and said respective bridging member.

23. A disc brake caliper body according to claim 22, wherein the peripheral stiffening band on the non-mounting side limb extends about the trailing longitudinal end of its respective limb and connecting with a respective bridging member at said trailing end of the disc brake caliper body, said at least one further opening being defined in said region of the disc brake caliper body located between said extending portion of said non-mounting side peripheral stiffening band, said trailing end of said non-mounting side limb and said trailing end bridging member.

24. A disc brake caliper body according to claim 22, wherein each limb has three cylinder housing portions, said lateral inner wall region extending between each adjacent pair of said cylinder housing portions in a radially outer side of said at least one limb, wherein at least two through openings are defined in said lateral inner wall region, each said opening being at least partially located between a respective pair of adjacent cylinder housing portions.

25. A disc brake caliper body according to claim 22, wherein each limb has three cylinder housing portions, said lateral inner wall region extending between each adjacent pair of said cylinder housing portions in a radially inner side of said at least one limb, wherein at least two through openings are defined in said lateral inner wall region, each said opening being at least partially located between a respective pair of adjacent cylinder housing portions.

26. A disc brake caliper according to claim 22, wherein each limb has an lateral inner wall region extending between adjacent cylinder housing portions, at least one said through opening being defined in said lateral inner wall region of at least one of the limbs.

27. A disc brake according to claim 22, wherein the limbs are rigidly interconnected by means of a stiffening strut extending between radially outer ends of said lateral inner wall regions of the two limbs.

28. A disc brake caliper according to claim 22, wherein said at least one further opening comprises two openings which are defined in said region of the disc brake caliper body located between said extending portion of said at least one peripheral stiffening band, said longitudinal end of said respective limb and said respective bridging member.

29. A disc brake caliper comprising a caliper body as claimed in claim 1 or 22.

* * * * *

UNITED STATES PATENT AND TRADEMARK OFFICE

CERTIFICATE OF CORRECTION

PATENT NO. : 9,046,141 B2
APPLICATION NO. : 12/218499
DATED : June 2, 2015
INVENTOR(S) : Richard Arnold Bass et al.

It is certified that error appears in the above-identified patent and that said Letters Patent is hereby corrected as shown below:

IN THE SPECIFICATION

Col. 3, Line 15

Change “increases” to read --increase--.

Col. 7, Line 51

After “able” insert --to--.

IN THE CLAIMS

Col. 12, Line 9

Change “about a longitudinal And of” to read --about a longitudinal end of--;

Col. 12, Line 40

Change “hand” to read --band--.

Signed and Sealed this
Twenty-fourth Day of November, 2015

Michelle K. Lee

Michelle K. Lee
*Director of the United States Patent and Trademark Office*